Feb. 22, 1949.    S. K. WELLMAN    2,462,821
METHOD OF MAKING COMPOSITE ARTICLES
Original Filed March 1, 1943    2 Sheets-Sheet 1
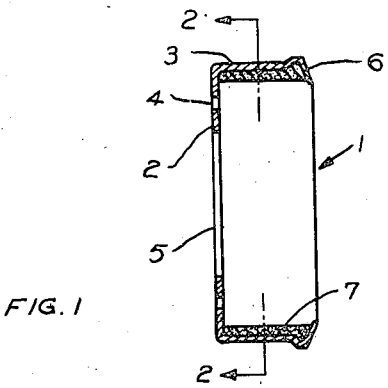
FIG. 1
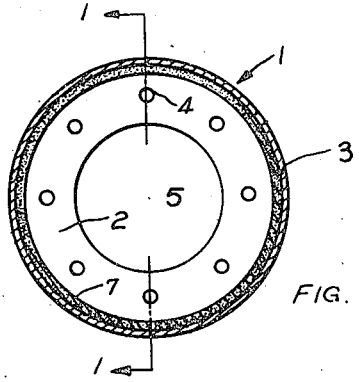
FIG. 2
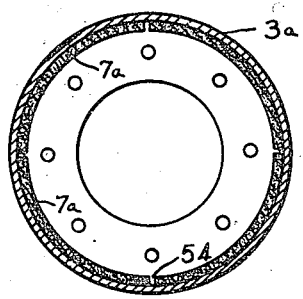
FIG. 9
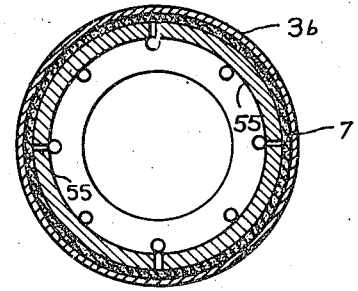
FIG. 10
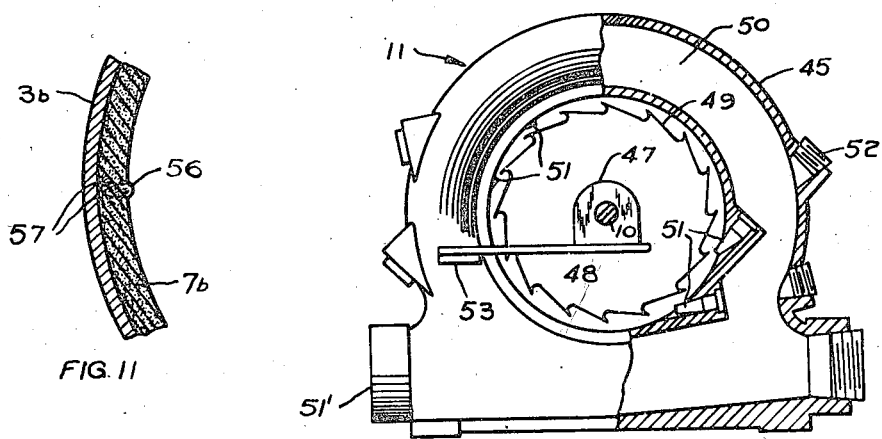
FIG. 11
FIG. 7
INVENTOR.
SAMUEL K. WELLMAN
BY
C. Thomas Cox Feb. 22, 1949.   S. K. WELLMAN   2,462,821
METHOD OF MAKING COMPOSITE ARTICLES Original Filed March 1, 1943   2 Sheets-Sheet 2

INVENTOR.
SAMUEL K. WELLMAN
BY C. Thomas Cox

Patented Feb. 22, 1949

2,462,821

UNITED STATES PATENT OFFICE 2,462,821

METHOD OF MAKING COMPOSITE ARTICLES

Samuel K. Wellman, Cleveland Heights, Ohio, assignor to The S. K. Wellman Company, Cleveland, Ohio, a corporation of Ohio Substituted for abandoned application Serial No. 477,568, March 1, 1943. This application January 22, 1945, Serial No. 573,907

4 Claims. (Cl. 29—152.2)

This invention relates to a method of making improved composite articles such as friction brakes, friction clutches, bearings and other articles provided with a cylindrical surface having a lining of improved friction properties adapted for sliding engagement with a machine element or body.

It is old to form friction articles, such as clutches and brakes, and bearings of various forms by compressing and sintering powdered metal compositions, and in cases where improved physical properties such as strength and impact resistance are desired, it is customary to provide a solid metal backing member for the sintered composition. Thus, a mixture of metal powder and nonmetallic friction material, such as graphite and/or silica, is compressed and heated in contact with a solid metal backing member to sinter the powder together and to bond it to the backing member. This procedure results in the production of strong composite articles of improved frictional properties. However, the pressing of the powders is conventionally accomplished by the application of mechanical pressure, and this imposes definite structural limitations on the resulting article. So far as I am aware, the prior art has been unable to successfully press powder into a large hollow cylindrical shape either directly in contact with a cylindrical backing member of rather large diameter or into a cylindrical compact or briquette for subsequent application to a backing member.

Attempts have been made to press the powder to a hollow cylindrical or curved shape by applying pressure at right angles to the axis of the surface of the cylinder, but this results in segregation and variations in density and thickness. Attempts have also been made to press the powder to hollow cylindrical shape by using a mold having an annular channel and applying pressure in a direction parallel to the surface of the cylinder. This latter procedure functions successfully if the mold channel is of shallow depth or of small radius but is impractical if a large cylindrical compact or briquette of powder is desired.

Furthermore, all processes using mechanical means to press the powder have definite cost limitations, i. e., the powders are usually pressed at pressures running from 5 to 100 t. s. i.; obviously, if the shape desired is large, the size of the required press is enormous and the cost prohibitive.

Also, it is desirable to apply pressure to the powder during the sintering operation to hold it in contact with the backing member. This is very difficult in case of a cylindrical shape.

The use of compressed and sintered powdered metal compositions as a facing or lining for solid metal backing members is highly desirable since it results in the production of an article of great strength and yet one that has a surface of desired frictional properties, including coefficient of friction, wear resistance, and heat conductivity. It is an object of my invention to provide an improved method of producing a composite body of hollow cylindrical or curved shape having a lining of sintered powdered metal integrally bonded thereto which has all these desirable characteristics and is of improved construction.

It is a further object of my invention to provide an improved method of applying a lining of compressed and sintered powdered material to the inner surface of a hollow cylindrical backing member of solid metal whereby a composite article of improved strength, frictional properties, and heat dissipating ability is obtained.

Other and further objects will be apparent from the following description.

According to my invention, a metal powder mixture of suitable composition is applied to the interior surface of a hollow cylindrical backing member of solid metal which is rotated about its axis. The rotation of the member and the centrifugal force developed are utilized to distribute the powder around the surface and to result in compaction and densification of the powder. While the member is still rotating, heat is applied to the powdered material to sinter it and cause it to bond to the backing member and form a friction lining. If desired, mechanical pressure may be applied to the lining either before, after, or during the sintering step. An automobile brake drum is one suitable article that may be produced according to my invention, and I have selected this example as illustrative, but it is to be understood that the invention is not limited thereto.

Referring now to the drawings:

Fig. 1 is a sectional view of a brake drum on the line 1—1 of Fig. 2.

Fig. 2 is a sectional view on the line 2—2 of Fig. 1.

Fig. 7 is an elevation view of the drive unit of Figs. 3 and 4, with parts in section.

Figs. 9 and 10 are sectional views similar to that of Fig. 2 showing a modified type of lining.

Fig. 11 is a fragmentary sectional view on an enlarged scale of the drum of Fig. 10 in one stage of its manufacture.

Figures 3, 8:
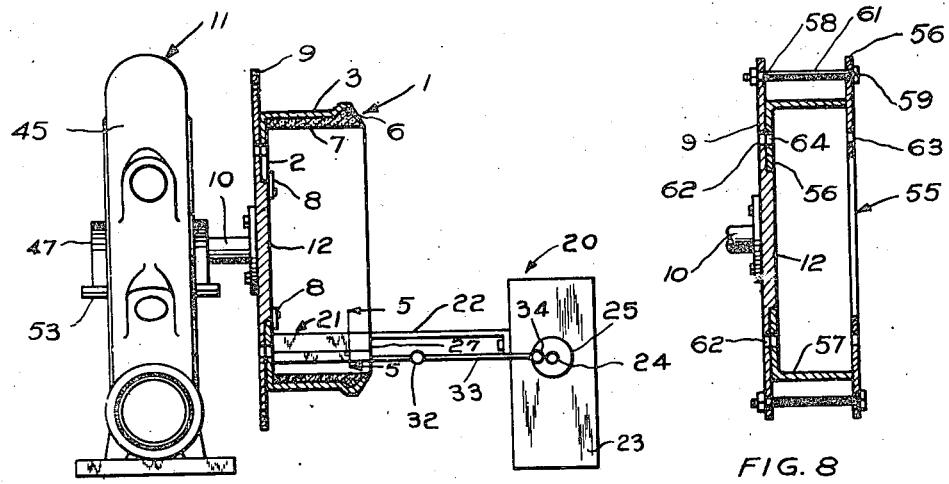
Fig. 3 is a side elevation view with parts in section of an apparatus for carrying out the method of my invention.
Fig. 8 is a sectional view of a portion of the structure of Figs. 3 and 4 showing a modified arrangement for securing the drum in place.

In Figs. 1 and 2, I have shown a conventional pressed steel brake drum, of automobile type that has been provided with a lining according to my invention. This brake drum is designated in its entirety by the reference character 1 and comprises a central plate portion 2 and an annular peripheral flange 3 having an inwardly extending bead 6. The plate 2 is of annular shape having a large central opening 5 and is provided with a series of spaced holes 4 adapted to receive bolts or rivets to secure the drum to the wheel or axle as is well-known in the art.

A friction facing 7 forms a lining for the annular flange 3 and constitutes the braking surface of the drum. This facing 7 comprises a sintered mixture of metallic and nonmetallic material integrally bonded to the flange or backing member 3 through the application of heat and pressure in a manner to be hereinafter described.

Figures 4, 5, 6:
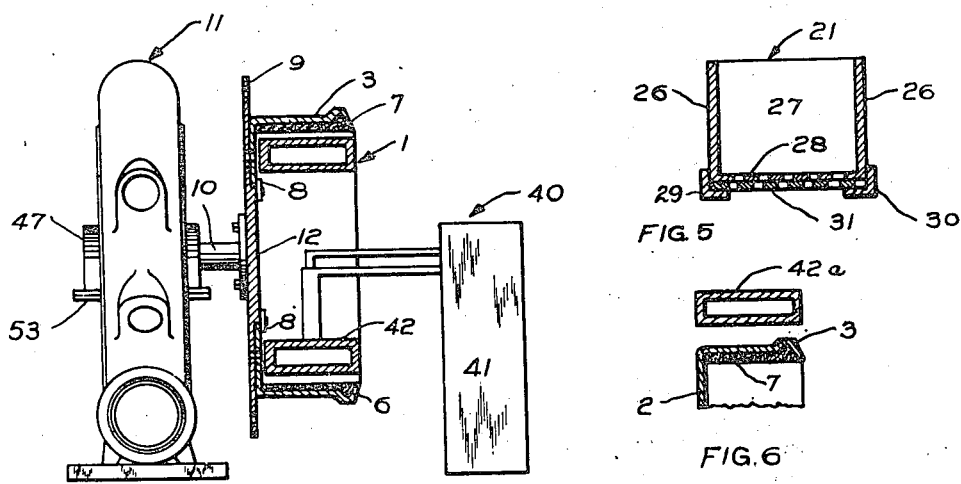
Fig. 4 is a view similar to Fig. 3 but showing apparatus for sintering the lining.
Fig. 5 is a sectional view on an enlarged scale of the feed hopper and is taken on the line 5—5 of Fig. 3.
Fig. 6 is a sectional view showing a modified heating arrangement.

In Figs. 3 and 4, I have shown suitable apparatus for producing the friction facing 7. The brake drum 1 is secured by clamps 8 to a face plate 9 of the shaft 10 of a high-speed drive unit designated generally as 11. This face plate has a raised central portion 12 adapted to enter the central opening 5 of the drum and serves to position the drum as well as to carry the clamps 8. The drive unit can be any suitable power source adapted to rotate the drum at a high speed, but I have found that an air-driven motor, which I will describe later in greater detail, is a suitable power unit.

The mechanism used to apply the powder to the drum is indicated generally at 20 and comprises a pan or hopper 21 adapted to hold a measured amount of powder and provided with a feeding mechanism at the bottom thereof to insure uniform distribution of the powder. While it is possible to merely dump the required amount of powder into the drum and allow it to be distributed by centrifugal force, I find it preferable to provide a feeding mechanism because less segregation will occur in the powder.

As will be more clearly shown in Fig. 5, the powder feeding mechanism constitutes a modified sifter or shaker. The hopper 21 is supported by means of an arm 22 on the housing 23 which contains a motor adapted to rotate the shaft 24 of eccentric 25 which is used to sift the powder from the hopper. The hopper 21 is of rectangular shape having side walls 26 and end walls 27. The hopper is open at the top and is provided with a perforated bottom 28. The diameter of the perforations of the bottom should be such as to freely permit the powder to pass therethrough and yet still be sufficiently small to obtain a rather uniform distribution of the powder which falls from the hopper. The bottom of the hopper is provided with a pair of opposed channel members 29, 30 which form a guideway for the foraminous member 31 which is pivotally secured at 32 to the connecting rod 33 which in turn is pivoted at 34 to the eccentric 25. It will be apparent that by suitably selecting the diameter of the perforations in the bottom 28 and the member 31 and controlling the speed of rotation of the eccentric 25, a uniform distribution of powder on the flange 7 of the brake drum may be obtained. These factors should be so controlled that the drum makes a multitude of revolutions before the hopper is empty. While I have described in a rather detailed manner the powder feeding mechanism 20, it is apparent that there are many other suitable apparatus for applying the powder in a uniform layer on the drum 7.

The rapid rotation of the drum serves to further uniformly distribute the powder and to compact or densify it.

After the powder layer 7 has been applied, and while the drum is still being rotated, the powder spreading apparatus 20 is removed and is replaced by an induction heating mechanism 40. This heating mechanism comprises a suitable source 41 of high-frequency current and a single turn, annular, water-cooled induction coil 42 of copper. The passage of high-frequency current through the coil 42 induces heat in the powdered facing 7 and the flange 3 and causes the powdered mixture to sinter together and to integrally bond to the flange 3. When the sintering is completed, the induction heating unit 40 may be withdrawn, the drive unit 11 brought to a stop and the lined brake drum removed to be replaced by another drum to be treated.

While I have illustrated an induction heating unit 40 as a suitable heating means, it is apparent that the heat required may be applied by numerous other methods, such as by placing a heating furnace around the whole drum, or by applying the flame of an oxyacetylene torch to the exterior surface of the flange 3. However, induction heating is desirable in that heat is generated so quickly in the facing that the powder is not oxidized, and it is not necessary to provide a protective atmosphere. Furthermore, the depth of heating may be controlled by varying the frequency as is well-known in the art.

In Fig. 6, I have shown a modification in which the induction heating coil 42a is placed outside rather than inside the drum. It is apparent that this modification results in strong heating of the annular flange 3 as well as of the facing 7 and will result in the production of a strong bond between the facing and the flange.

In order to satisfactorily cause the facing to bond to the backing or flange 3, the surface of the flange must be clean and is preferably given a thin plating of protective metal in a manner described in my Patent No. 2,178,527. As described in that patent, a thin electroplating of a metal such as copper or nickel will protect the clean surface of the backing during the sintering step. A plating of iron, or silver may also be used. Generally, a plating thickness of only .0001" is sufficient. This plating is sufficiently thin so that it disappears during the sintering step, and the powder bonds directly to the backing.

The drive unit 11 of Figs. 3 and 4 comprises an air turbine which I have found to be very satisfactory as a mechanism for rotating the brake drum. As shown in these figures, the drive unit comprises a housing 46 carrying the bearings 47 which support the drive shaft 10. Referring now to Fig. 7 which shows a front elevation of the drive unit, the shaft 10 has secured thereto a turbine wheel 48 which is provided with a peripheral series of teeth or buckets 49. The housing 46 is preferably formed as a casting having an air chamber 50 connected by means of a pipe 51' with a suitable supply of air under pressure. Disposed around the wheel and communicating with the air chamber are pairs of nozzles 51 adapted to deliver air under pressure from the chamber 50 to the buckets 49 of the wheel 48. The casing is provided with a plugged opening 52 at the exterior thereof aligned with each nozzle to permit removal and access thereto. A bearing 47 is supported on a plate 53 welded to each face of the casing 45.

The brake drum shown in Figs. 1 to 4 and 6 has an inwardly extending portion at the bead 6 which serves to retain the powder in place before sintering. However, not all drums have such a bead. Therefore, in Fig. 8 I have illustrated a modified apparatus to permit the lining of drums which lack a retaining bead. The brake drum is generally indicated at 55 and comprises a central plate portion 56 and a cylindrical annular flange 57. This brake drum is shown in position against the face plate 9 of the drive unit 11 and is secured thereto by means of the annular ring 56. This annular ring has an outside diameter that it substantially the same as the face plate 9 and an inside diameter that is somewhat less than the inside diameter of the flange 57 and forms a retaining wall for the powder to be inserted in the drum. The face plate 9 and ring 59 are provided with an outer series of spaced and aligned holes 58—59 through which bolts 61 are passed to secure the ring in place and hold the drum against the face plate. The face plate and ring 59 also have an inner series of aligned holes 62—63 which align with the spaced holes 64 in the central plate portion 56 of the brake drum. These holes 64 correspond to the holes 4 of Figs. 1 and 2. The setup shown in Fig. 8 is adapted for internal heating by the heating apparatus 40 of Fig. 2, but if it is desired to apply external heat as in Fig. 6, then the bolts 61 will be located through the inner series of holes 62, 63, 64 so as not to obstruct the heating coil 42a. While the bolts in their inner position will prevent perfect operation of the feeding or shifting device 20 in distributing the powder, the rapid rotation of the drum serves to satisfactorily distribute the powder throughout the flange 57.

The powder mixture used for the facing may be predominantly metallic and of a composition such as disclosed in my prior Patent No. 2,178,527 and preferably comprises a mixture of metal powders such as iron or copper with minor amounts of non-metallic material such as graphite and silica. The mixture preferably also contains minor amounts of other metals such as lead, tin, and zinc which may be present either as separate powdered metals or as an alloy with the base metal. I have found that a mixture of 80% iron with 20% lead, with or without 4% graphite, preferably produced as in Patent No. 2,261,196, is a suitable mixture. Another suitable mixture would be 73% copper, 14% lead, 7% tin, and 6% graphite. However, any of the well-known powder metal compositions can be utilized. The sintering temperature will be found to lie from 1200 and 1480° F. or even higher depending upon the percentage of iron, if any, in the composition.

The speed of rotation of the drum is not critical but must be sufficient to distribute and compact the powder. As a general rule, the speed should be sufficient to apply a force to the powder, due to centrifugal force, of from 2 to 11 t. s. i. Due to the fact that the heat and pressure are applied simultaneously, during the sintering and bonding operation, relatively low pressures are adequate. For example, in applying a friction facing ¼" thick to a brake drum 8" in diameter, I have found that a speed of 10,000 r. p. m. is suitable. Such a speed is well within the range of an air-driven turbine such as I have described above.

In Fig. 9, I have shown a sectional view of a brake drum having a modified type of lining. This drum has an annular flange 3A provided with a lining or facing 7A which has been slotted at the points 54 to allow room for expansion due to heat. Such slots are often desirable if the facing is predominantly composed of a metal having a high coefficient of expansion such as copper. This facing may be formed in the same manner as that of Figs. 1 and 2, and the slots cut by a suitable tool after the lining is sintered.

In some instances, it may be desirable to apply additional pressure besides that due to centrifugal force. I have found that this can be done by placing weights 55, see Fig. 10, inside the drum and against the powdered lining, either before or after the lining has been sintered. As shown in Fig. 9, the weights 55 comprise a series of arcuate sections adapted to form a multi-part ring or segmented annular member having an outside diameter approximately the same as the inside diameter of the facing. The segments 55 may be placed against the facing after it has been distributed around the flange 3B by the rapid rotation of the brake drum, the drive unit having been stopped to permit insertion of the segments 55. When the unit is again set in rotation, these segments will apply high pressure to the facing due to centrifugal force. The segments should, of course, be of material having sufficient weight to apply the desired pressure. I have found that cast iron ¼" thick is a suitable material. If these segments are applied to the unsintered facing, it will then be necessary to sinter the powdered material. To accomplish this, the segments 55 may be removed and an internal induction coil such as that shown in Fig. 4 utilized, or the heat may be applied from the exterior of the drum, as in Fig. 6, without removing the segments. While it is desirable that these segments fit closely together so as to form a nearly continuous ring, it is apparent that there will be some space between their ends. This space will result in the production of beads or raised portions where the material is either not compacted or is caused to flow into the space between adjacent segments. These beads are shown at 56 in Fig. 11 and must be removed before the drum is placed in use. If slots are to be formed in the facing such as shown at 54 in Fig. 9, it is advantageous to cut the slots at the location of the beads 56 so that not only the beads but the less dense material of the facing is removed. The dotted lines 57 in Fig. 11 represent the boundary edges of such slots.

It may be desirable to form a facing having several layers of different composition. For example, if an iron base ring is to be used to provide the braking surface, it may be desirable to provide an intermediate layer or lining of material having a high heat conductivity so as to readily conduct the heat developed in the facing to the flange of the brake drum. This may be accomplished either by providing an inner layer of sheet copper or by producing a thin sintered layer of substantially pure copper by the methods of my invention and then producing thereon a further layer possessing the desired frictional properties such as, for example, an iron base sintered composition. If sheet copper is to be used, an annular hoop of copper may be used and brazed or soldered to the inner surface of the flange. The inner surface of this copper hoop should be clean and preferably given the electroplating of metal before applying the sintered facing. If the inner heat conducting layer is formed by sintering copper powders, the surface produced is well-suited to have bonded thereto an iron or copper base powdered mixture without further treatment.

In some instances, particularly where induction heating is not available and a slower heating means is used, it may be desirable to conduct the pressing and sintering steps under non-oxidizing conditions. This may be accomplished by enclosing either the drum alone or the entire unit in a housing supplied with a protective atmosphere or by supplying a protective gas to the interior of the drum from supply pipes having orifices near the powdered material. However, if induction heating is utilized, such protective measures will usually not be required.

By following my invention as set forth above, it is apparent that large hollow cylindrical articles of solid metal may be given a lining of sintered powdered materials and that the field of powder metallurgy has been extended. A brake drum such as that for an automobile may be given a lining of desired frictional characteristics including coefficient of friction, wear resistance, and heat conductivity, and the drum itself may be composed of a solid metal having the desired properties. Thus, it is no longer necessary to construct the drum of steel for strength and sacrifice wear resistance or to construct the drum of cast iron for wear resistance and sacrifice strength or to attempt to combine steel and cast iron to produce a hybrid structure of poor heat dissipating properties. Similarly, steel backed bearings, cylindrical clutches and other cylindrical articles may be readily produced.

This application is a substitute for abandoned application S. N. 477,568 filed March 1, 1943.

I claim:

1. The method of producing a friction facing on the inner face of the peripheral annular flange of a brake drum comprising the steps of providing a clean surface on the inner face of the flange, rapidly rotating said drum about the axis of the drum, uniformly supplying a measured amount of powdered friction material to said clean surface, said powdered material comprising a mixture of powdered metals with minor amounts of powdered nonmetallic friction material, controlling the speed of rotation of the drum and the feed of the powdered material so that said material is distributed and compacted, stopping the rotation of said drum, and inserting a segmented annular member having an outside diameter substantially the same as the inner diameter of the distributed powder layer, then rapidly rotating said drum and applying heat to the powdered material whereby a dense sintered friction facing is produced on the inner face of the flange.

2. The method of claim 1 including the step of slotting the sintered facing at points located at the joints of the segmented ring.

3. The method of producing a facing on the interior of a hollow cylindrical article of solid metal comprising the steps of providing a clean surface on the interior of said article, rapidly rotating said article about its axis, applying a measured amount of predominantly metallic powder to said surface, controlling the speed of rotation of the article so that the powder is uniformly distributed and compacted, stopping the rotation of said article, inserting in said article a segmented annular member having an outer diameter substantially the same as the inner diameter of the distributed powder layer, then rapidly rotating said article and applying heat to the powder to sinter it and bond it to said surface.

4. The method of producing a facing on the interior of a hollow cylindrical article of solid metal comprising the steps of providing a clean surface on the interior of said article, applying a measured amount of predominantly metallic powder to said surface, rotating said article about its axis at a speed sufficient to distribute said powder on said surface and to press the same against said surface through the action of centrifugal force under a pressure of from two to eleven tons per square inch, and heating the powder to a sufficient temperature and for a sufficient length of time to sinter said powder and integrally bond it to said surface.

SAMUEL K. WELLMAN.

REFERENCES CITED

The following references are of record in the file of this patent:

UNITED STATES PATENTS

| Number | Name | Date |
|---|---|---|
| Re. 22,282 | Swartz | Mar. 2, 1943 |
| 2,115,980 | Sinclair | May 3, 1938 |
| 2,153,173 | Campbell | Apr. 4, 1939 |
| 2,185,875 | Van Halteren | Jan. 2, 1940 |
| 2,262,983 | Woods | Nov. 18, 1941 |
| 2,287,952 | Tormyn | June 30, 1942 |
| 2,341,739 | Olt | Feb. 15, 1944 |